United States Patent

McCauley et al.

[11] Patent Number: 4,712,586
[45] Date of Patent: Dec. 15, 1987

[54] PIPE PLUG AND CENTERING CONSTRUCTION FOR CENTERING RIDGED KEY IN MATING GROOVE IN PIPE PLUG

[75] Inventors: Durham S. McCauley; Jeffrey R. Sullivan, both of Boston, N.Y.

[73] Assignee: McGard, Inc., Buffalo, N.Y.

[21] Appl. No.: 900,975

[22] Filed: Aug. 27, 1986

Related U.S. Application Data

[63] Continuation of Ser. No. 732,675, May 10, 1985, abandoned.

[51] Int. Cl.[4] ............................................. F16L 55/10
[52] U.S. Cl. ..................................... 138/89; 411/429; 220/210
[58] Field of Search ................. 138/89, 96 T, 96 R; 220/235, 233, 284, 210; 411/429, 910, 911, 403, 405, 407, 410, 307, 333; 81/176.15, 176.2; 70/158, 163, 170; 215/207, 215, 296

[56] References Cited

U.S. PATENT DOCUMENTS

| | | | |
|---|---|---|---|
| 1,656,228 | 1/1928 | Parish | 220/284 |
| 1,712,361 | 5/1929 | Soderquist | 70/170 |
| 2,556,155 | 6/1951 | Stellin | 411/410 |
| 2,973,880 | 3/1961 | Rowell | 220/284 |
| 3,134,292 | 5/1964 | Walton | 411/910 |
| 3,302,672 | 2/1967 | Walton | 411/911 |
| 3,604,305 | 9/1971 | Dreger | 411/403 |
| 3,929,152 | 12/1975 | Graham | 220/284 |
| 4,480,513 | 11/1984 | McCauley et al. | 411/429 |
| 4,496,065 | 1/1985 | Nagy | 215/207 |
| 4,503,880 | 3/1985 | Hochman | 138/89 |

Primary Examiner—James E. Bryant, III
Assistant Examiner—Leo J. Peters
Attorney, Agent, or Firm—Joseph P. Gastel

[57] ABSTRACT

A pipe plug which cannot be removed from a pipe with the same key with which it is installed, the pipe plug having a body with a plurality of arcuate grooves having inclined arcuate ramps leading from its face into its body and terminating at shoulders for abutting engagement with first key having pins which bear against the shoulders to tighten the plug in the pipe but which cannot loosen the plug because the pins will ride up the ramps and cam out of engagement with the plug, and a second key for removing the plug including a ridge on the second key for mating with a complementary curvilinear groove in the plug. A counterbore is provided in the face of the plug to receive portions of the ridge which are of substantially the same diameter as the counterbore to thereby center the second key with respect to the plug and guide it while the second key is rotated until the ridge thereon falls into the groove to effect mating engagement therewith.

13 Claims, 13 Drawing Figures

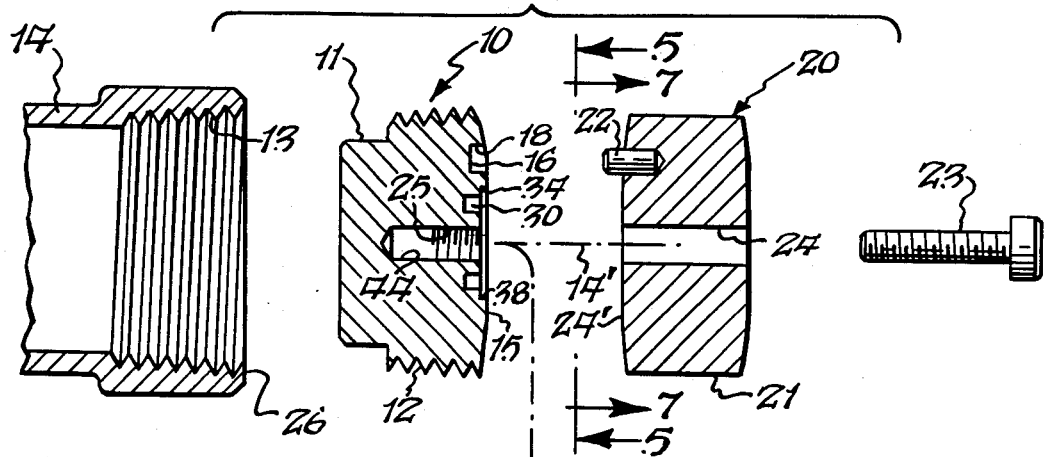
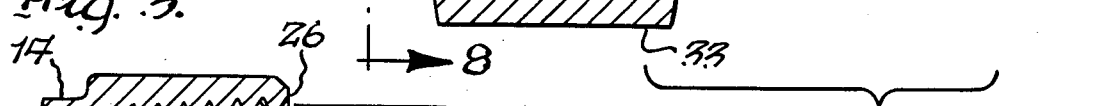
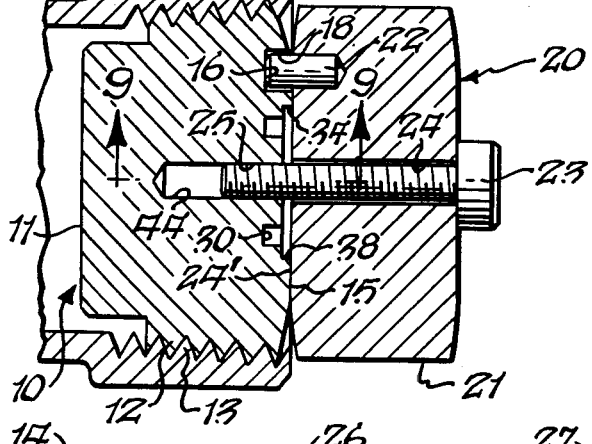
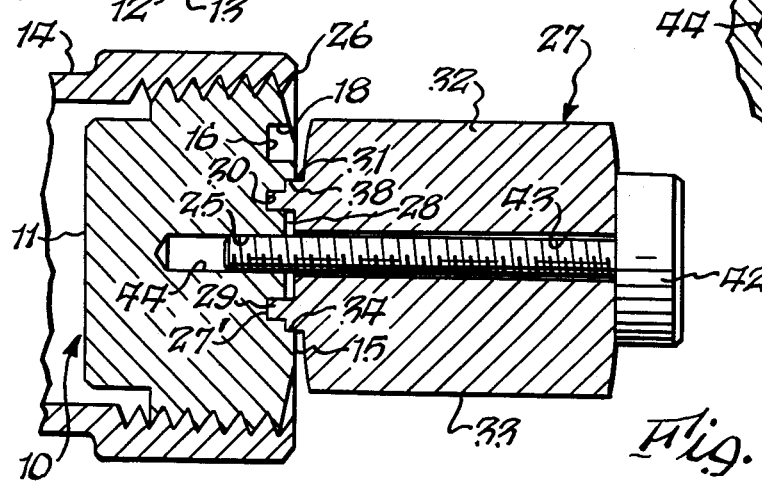
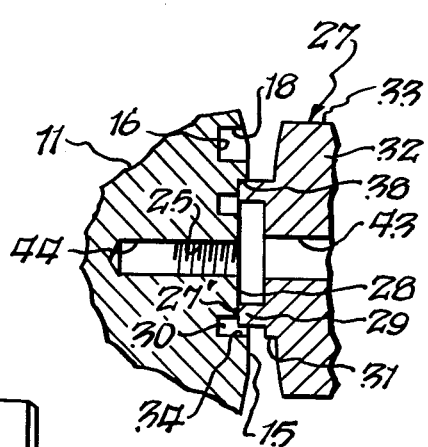

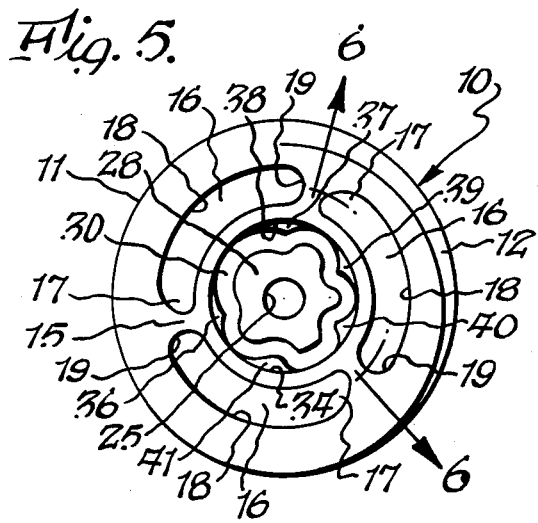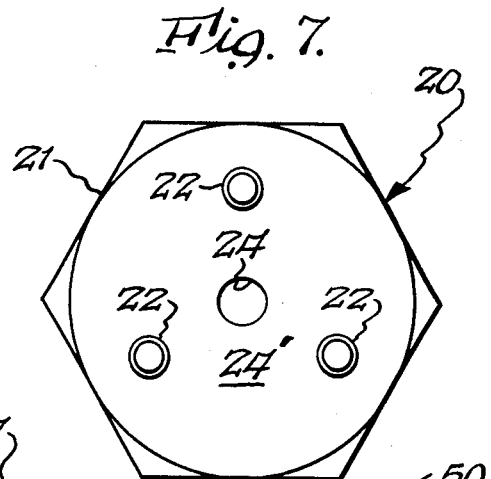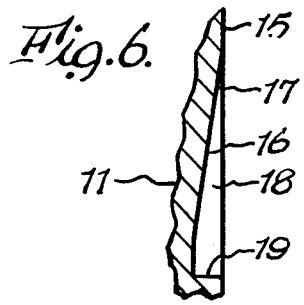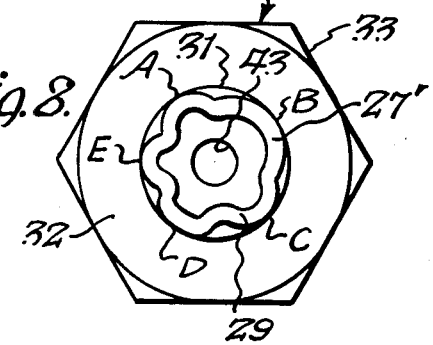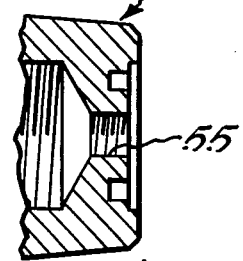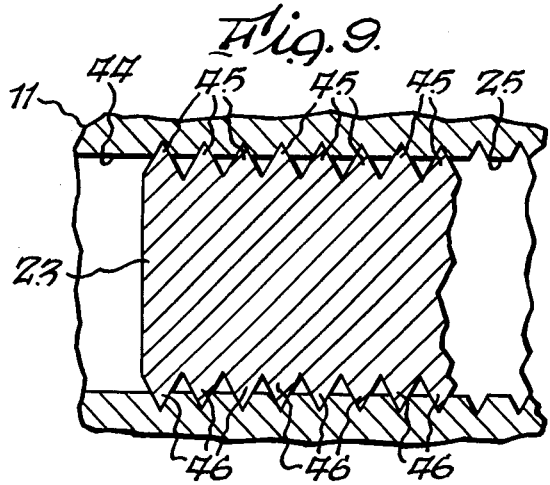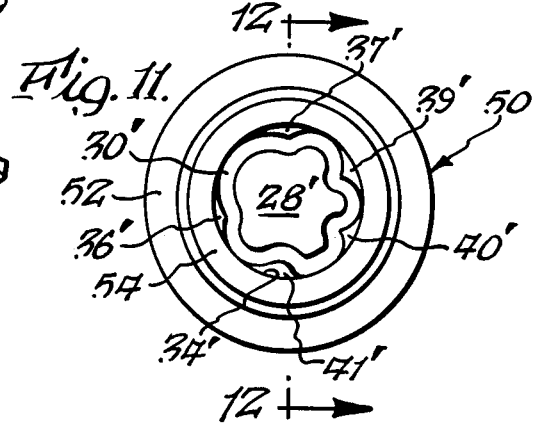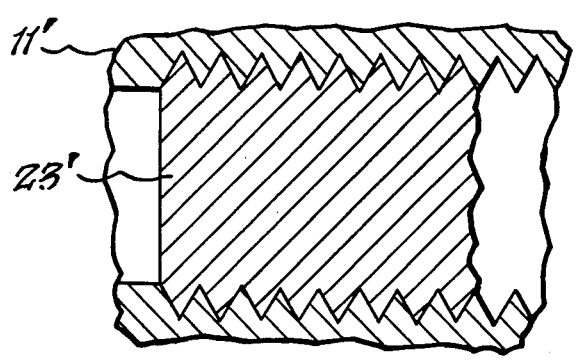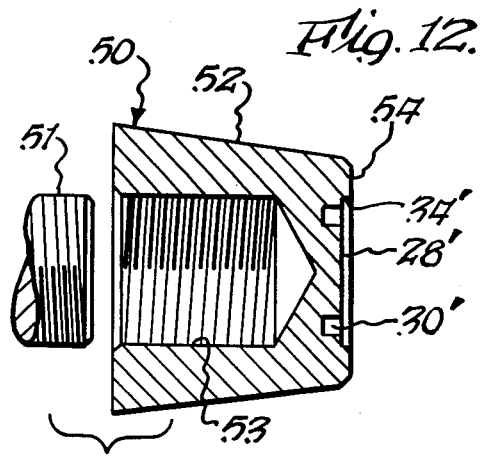

PIPE PLUG AND CENTERING CONSTRUCTION FOR CENTERING RIDGED KEY IN MATING GROOVE IN PIPE PLUG

This is a continuation of application Ser. No. 732,675 filed May 10, 1985, now abandoned.

BACKGROUND OF THE INVENTION

The present invention relates to an improved plug which can be installed into a pipe with an installation key but can be removed only with a removal key, and it also relates to an improved structure for aligning a key having a curved ridge with the mating curved groove of a plug or a nut.

By way of background, in certain instances it is necessary to have a type of plug which can be installed in a pipe by many people but which can be removed only by a select few people having a special removal key. This type of plug is generally used where it is necessary to shut off a gas meter or water meter. In situations of this type the plugs can be installed by numerous personnel who are sent out on routine calls for this purpose. However, it is desirable that the task of removing the plugs be delegated to only a few select personnel to whom removal keys are entrusted. By following this procedure, there need be only very few removal keys in existence, and therefore the risk of these keys being duplicated for unauthorized removal of plugs is greatly diminished.

SUMMARY OF THE INVENTION

It is accordingly the primary object of the present invention to provide a pipe plug which can be installed in a pipe with a first type of key which cannot be used to remove the plug, and which can only be removed by the use of a second type of key available only to a limited number of personnel.

Another object of the present invention is to provide an improved construction for facilitating the insertion of a key having an irregular curved ridge thereon into an irregular curved groove in a body portion of a member such as a nut or plug. Other objects and attendant advantages of the present invention will readily be perceived hereafter.

The present invention relates to a pipe plug comprising a body having an axis, threads on said body, a face on said body, a plurality of arcuate ramps on said face, said arcuate ramps being oriented about said axis, each of said ramps having a first end and a second end and a surface which leads away from said face and which extends a greater distance into said body as it progresses toward said second end from said first end and terminates at a shoulder at said second end, said threads on said body having a tightening direction which is the same as the direction of said ramps leading toward said shoulders, and a curvilinear key-receiving groove in said face, said curvilinear groove being oriented about said axis.

The present invention also relates to a body member having an axis of rotation, threads on said body member for mounting said body member on an object, a face on said body member which is transverse to said axis of rotation, a curvilinear key-receiving groove in said face, and a counterbore in said face surrounding said groove. The various aspects of the present invention will be more fully understood when the following portions of the specification are read in conjunction with the accompanying drawings wherein:

BRIEF DESCRIPTION OF THE DRAWINGS

FIG. 1 is a fragmentary exploded cross sectional view showing the improved pipe plug of the present invention relative to a pipe into which it is to be inserted and also showing the key for threading the plug into the pipe;

FIG. 2 is an exploded cross sectional view of the key for unscrewing the plug from the pipe;

FIG. 3 is a cross sectional view showing the plug installing key and plug in assembled relationship with the plug in its installed position in a pipe;

FIG. 4 is a cross sectional view showing the plug removing key in assembled relationship with the plug for unscrewing the plug from the pipe;

FIG. 4A is a fragmentary view similar to FIG. 4 but showing the relative positions of the plug and key when the ridge of the key is first inserted into the counterbore and before it is seated therein;

FIG. 5 is a view of the face of the plug taken substantially in the direction of arrows 5—5 of FIG. 1;

FIG. 6 is a fragmentary cross sectional view taken substantially along line 6—6 of FIG. 5 and showing the inclination of one of the ramps in the face of the pipe plug;

FIG. 7 is a view of the plug installing key taken substantially in the direction of arrows 7—7 of FIG. 1;

FIG. 8 is a view of the face of the plug removal key taken substantially in the direction of arrows 8—8 of FIG. 2;

FIG. 9 is an enlarged cross sectional view taken substantially in the direction of line 9—9 of FIG. 3 and showing the degree of engagement between the internal threads in the pipe plug and the threads on the bolt for holding the plug installing key in engagement with the pipe plug;

FIG. 10 is a cross sectional view similar to FIG. 9 but showing the normal degree of engagement between the threads on a bolt and the internal threads of a bore which it engages;

FIG. 11 is a view of the face of a nut having an endless curvilinear groove and a counterbore for receiving a key having a ridge for mating engagement with the curvilinear groove;

FIG. 12 is a fragmentary cross sectional view taken substantially along line 12—12 of FIG. 11; and FIG. 13 is a cross sectional view similar to FIG. 12 but showing a modified embodiment of the nut shown therein.

DESCRIPTION OF THE PREFERRED EMBODIMENTS

The pipe plug 10 includes a body 11 having a helical thread 12 thereon for mating engagement with internal threads 13 of pipe 14. Body 11 has an axis of rotation 14' and a substantially planar face 15 which is located at the outer end of body 11 and which extends transversely to axis 14'. A plurality of arcuate grooves 18 are positioned in face 15 with axis 14' at the center of rotation of each groove. At the bottom of each groove is a ramp 16. Each ramp 16 includes a first end 17 which is at substantially the same level as face 15 and it includes a second end which terminates at a shoulder 19 in body 11.

In order to install plug 10 in pipe 14, a key 20 is used. Key 20 is in the shape of a nut having a hexagonal outer periphery 21 for receiving a wrench. It has three pins 22 extending outwardly from its face 24' which are the same distance from the axis of rotation 14' as arcuate grooves 18. Pins 22 are placed in grooves 18 and key 20 is turned clockwise in FIG. 5 until they abut shoulders 19. A bolt 23 is inserted through bore 24 in key 20 and threads into internal threads 25 in bore 44 of body 11 to lock key 20 to plug 10. Thereafter, a wrench can be applied to the hexagonal outer periphery 21 to tighten plug 10 into the position shown in FIG. 3. Threads 12 and 13 are pipe threads and are therefore tapered so that the more plug 10 is turned into pipe 14, the tighter it becomes lodged therein. Preferably plug 10 is inserted in pipe 14 so that face 15 is recessed for one or two threads from pipe edge 26. Causing plug 10 to lodge tightly in threads 13 to provide a gas-tight seal with face 15 recessed a desired amount is achieved by making threads 12 slightly oversize so that they will bind with threads 13. Thereafter, bolt 23 is unthreaded and key 20 is removed from mating engagement with plug 10. Since ramps 16 descend into body 11 in the direction of tightening threads 12, the plug 10 cannot be loosened from its lodged position in pipe 14 by applying unthreading forces to ramps 16 because the tool which is used merely cams out of the ramps.

Plug 10 can only be removed by the use of a special key 27 which has an endless curvilinear ridge 29 which mates with endless curvilinear groove 30 which is located in face 15 of plug 10 and is oriented about axis 14'. Curvilinear ridge 29 is mounted on cylindrical base 31 which extends outwardly from key body 32 having an outer hexagonal periphery 33. Points A, B, C, D and E of curvilinear ridge 29 lie on a circumference of a circle which fits closely with cylindrical inner surface 38 of counterbore 34 in plug 10. Therefore, when ridge 29 is first placed into counterbore 34 it will be centered relative to the axis 14' of plug 10 even though ridge 29 does not yet mate with groove 30. This is shown in FIG. 4A. In this respect parts of the end surface 27' of ridge 29 will rest on island 28 within groove 30 and on seats 36, 37, 39, 40 and 41 which lie within counterbore 34 and in the same plane as island 28. However, since the cylindrical inner surface 38 of counterbore 34 centers key 27 by engaging with points A, B, C, D and E, it is merely necessary to rotate the key 27 about its longitudinal axis while the outer edges at points A, B, C, D and E of ridge 29 are guided by cylindrical surface 38 until ridge 29 drops into mating groove 30. In this position, the cylindrical outer surface of base 31 will also be contiguous to internal cylindrical surface 38 of the counterbore and this contiguous abutting relationship will aid in stabilizing the key relative to the plug. At this time, the key 27 may be held and a wrench applied to the outer hexagonal periphery 33 to unscrew plug 10. However, preferably a bolt 42 may be inserted through bore 43 in body 32 of key 27 and thereafter threaded into threads 25 of bore 44 to hold key 27 and plug 10 in assembled mating relationship. Thereafter, a wrench can be applied to the hexagonal outer surface 33 of key 27 to unthread plug 10 from pipe 14. It is to be noted that the axial length of counterbore 34 is extremely short so that an expanding type of tool cannot be forced into engagement with side 38 for unscrewing plug 10.

Key 20, which is used to install plug 10 into pipe 14, cannot be used to unscrew it from pipe 14 even when bolt 23 fastens key 20 to plug 10. In this respect, the bore 44 in which internal threads 25 are located is oversize relative to the threads 46 of bolt 23 so that only the top portions 45 (FIG. 9) of threads 46 of bolt 23 engage internal threads 25. When the plug 10 is initially installed, it is installed with a torque of 50 foot pounds. If an attempt should be made to turn key 20 when it is locked to body 11 by bolt 23, pins 22 will tend to ride up ramps 16 toward the surface of face 15 to thereby to move key 20 away from face 15. A point will be reached where the tips 45 of the threads 46 on bolt 23 will be stripped because of their partial connection with threads 25 as shown in FIG. 9. This stripping is calculated to occur at about 20 foot pounds. It can therefore be seen that installing key 20 cannot be used to unscrew plug 10 from pipe 14. The value of having partial engagement between threads 46 and internal threads 25 can be more fully appreciated by reference to FIG. 10 which shows the normal threaded connection between a bolt 23' and a body 11' when the threads are in proper mating relationship rather than occupying the partial mating relationship of FIG. 9.

In FIGS. 11 and 12 certain portions of the present invention are shown in conjunction with frustoconical nut 50 which may be of the type used on lugs 51 which are mounted on an automobile hub and on which a wheel rim is mounted. Frustoconical nut 50 has an outer frustoconical surface 52 and a tapped bore 53 by which nut 50 is screwed onto lug 51. The face 54 of nut 50 includes a counterbore 34' which is the same as counterbore 34 of FIG. 5. Island 28' and bases 36', 37', 39', 40' and 41' are coplanar and are located at the inner end of counterbore 34'. Island 28' is bounded by groove 30'. The primed numerals represent structure which is the same as structure represented by the unprimed numerals of FIG. 5. Curvilinear groove 30' is for receiving a mating ridge, such as 29 of key 27 of FIG. 8. It can thus be seen that provision is made in the embodiment of FIGS. 11 and 12 for facilitating the centering of the ridge on a key, such as 27, relative to the groove 30', whereby all that is required to engage a groove 30' with a ridge 29 of a key is to insert the ridge 29 within the counterbore 34' and rotate it until the ridge 29 drops into mating engagement with groove 30', and when the latter occurs, the outer periphery of cylindrical base 31 will be contiguous to cylindrical counterbore surface 38'. In a nut such as shown in FIGS. 11 and 12, it is not necessary to have arcuate grooves such as 18. However, for certain applications, such grooves may be incorporated into the nut.

In FIG. 13 a modified embodiment of FIGS. 11 and 12 is shown which has a tapped bore 55 for receiving a bolt, such as 42, to lock the key 27 and nut 50' in assembled relationship.

The plug and nuts which have been described above are fabricated of hardened steel so as to resist chiseling or drilling which may be attempted to remove them.

While preferred embodiments of the present invention have been disclosed, it will be appreciated that the present invention is not limited thereto but may be otherwise embodied within the scope of the following claims.

What is claimed is:

1. A pipe plug which is installable in a pipe by the use of a first key which cannot be used to remove the pipe plug from the pipe and which is removable from the pipe only by the use of a second key comprising a body having an axis, threads on said body, a face on said body, a plurality of arcuate ramps on said face, said arcuate ramps being oriented about said axis, each of said ramps having a first end and a second end and a surface which leads away from said face and which extends a greater distance into said body as it progresses toward said second end from said first end and terminates at shoulder means at said second end for receiving said first key in abutting relationship for tightening said plug to install it when said first key is turned in a first direction but said first key camming out of said ramps without loosening said pipe plug to remove it when said first key is moved in an opposite second direction away from said shoulder means, said threads on said body having a tightening direction which is the same as the direction of said ramps leading toward said shoulder means, and curvilinear key-receiving groove means in said face for receiving said second key for removing said plug, said curvilinear groove means being oriented about said axis.

2. A pipe plug as set forth in claim 1 including counterbore means in said face in alignment with said curvilinear key-receiving groove means for both aligning said second key with said curvilinear groove means prior to entry of said second key into said curvilinear groove means and for receiving the mating base of said second key for stabilizing said second key after said second key enters said curvilinear groove means.

3. A pipe plug as set forth in claim 1 including a bore within the confines of said curvilinear groove means, and internal threads in said bore.

4. A pipe plug as set forth in claim 1 in combination with said first key, said first key comprising a plurality of pins for bearing against said shoulder means to turn said plug in the direction of tightening said threads.

5. A pipe plug as set forth in claim 4 including a bore within the confines of said curvilinear groove means, and internal threads in said bore.

6. A pipe plug as set forth in claim 4 in combination with said second key, and curvilinear ridge means on said second key for mating engagement with said curvilinear groove means.

7. A pipe plug as set forth in claim 6 including counterbore means in said face in alignment with said curvilinear groove means, a side on said counterbore means, said curvilinear ridge having outer circumferential areas for providing a close fit with said side of said counterbore means to align said second key with said pipe plug prior to entry of said curvilinear ridge means into said curvilinear groove means.

8. A pipe plug as set forth in claim 6 including counterbore means in said face in alignment with said curvilinear groove, a side in said counterbore means, and a base on said second key having a close fit with said side of said counterbore means, said base entering said counterbore means upon the entry of said ridge means into said groove means to thereby stabilize said curvilinear ridge means in said curvilinear groove means.

9. A pipe plug as set forth in claim 1 wherein said curvilinear groove means is located within said plurality of arcuate ramps and is substantially coaxial therewith.

10. A pipe plug as set forth in claim 1 in combination with said second key, ridge means on said second key for mating engagement with said curvilinear groove means, counterbore means in said body in alignment with said curvilinear groove means, a side on said counterbore means, said curvilinear ridge means having circumferential areas for engagement with said side of said counterbore means to align said ridge means with said curvilinear groove means upon rotation of said second key.

11. A pipe plug as set forth in claim 10 including a base on said second key, said ridge means being mounted on said base, said base being of a circumference to provide a close fit with said side of said counterbore means to thereby engage said side of said conterbore means when said ridge means is in said curvilinear groove means for stabilizing said ridge means in said curvilinear groove means.

12. A pipe plug and key combination comprising a body having an axis, threads on said body, a face on said body, a plurality of arcuate ramps on said face, said arcuate ramps being oriented about said axis, each of said ramps having a first end and a second end and a surface which leads away from said face and which extends a greater distance into said body as it progresses toward said second end from said first end and terminates at a shoulder at said second end, said threads on said body having a tightening direction which is the same as the direction of said ramps leading toward said shoulders, a key, said key comprising a plurality of pins for bearing against said shoulders to turn said plug in the direction of tightening said threads, a first bore in said body, internal threads in said first bore, a second bore in said key, a bolt extending through said second bore and terminating in said first bore, second threads on said bolt, said bore being oversize relative to said second threads so that only the outer ends of said second threads engage said internal threads, whereby when said key is turned in a direction away from said shoulders in an attempt to unthread said plug when said second threads of said bolt are in engagement with said internal threads, the second threads on said bolt will be stripped before said plug can be unthreaded from a pipe.

13. A pipe plug comprising a body having an axis, threads on said body, a face on said body, a plurality of arcuate ramps on said face, said arcuate ramps being oriented about said axis, each of said ramps having a first end and a second end and a surface which leads away from said face and which extends a greater distance into said body as it progresses toward said second end from said first end and terminates at a shoulder at said second end, said threads on said body having a tightening direction which is the same as the direction of said ramps leading toward said shoulders, a curvilinear key-receiving groove in said face, said curvilinear groove being oriented about said axis, a key, said key comprising a plurality of pins for bearing against said shoulders to turn said plug in the direction of tightening said threads, a bore within the confines of said curvilinear groove, internal threads in said bore, a second bore in said key, a bolt in said bore, and second threads on said bolt, said bore being oversize relative to said second threads so that only the outer ends of said second threads engage said internal threads, whereby when said key is turned in a direction away from said shoulders in an attempt to unthread said plug when said second threads of said bolt are in engagement with said internal threads, the second threads on said bolt will be stripped before said plug can be unthreaded from a pipe.

* * * * *